United States Patent Office

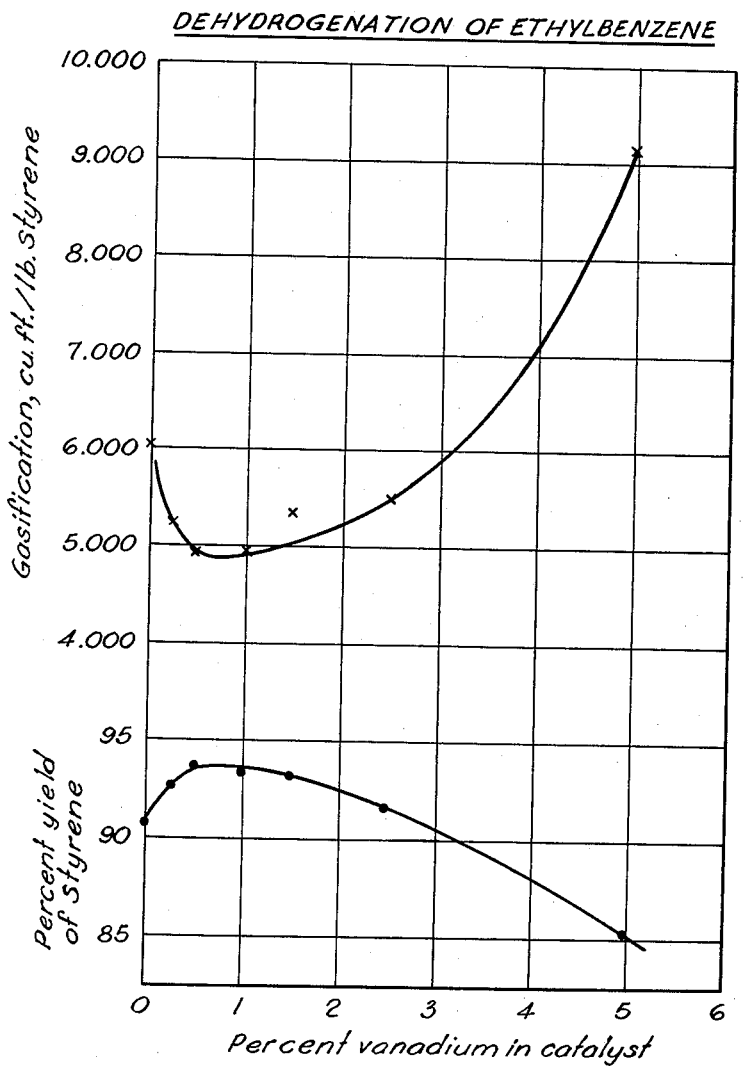

3,084,125
Patented Apr. 2, 1963

3,084,125
METHOD OF DEHYDROGENATING ETHYLBENZENE TO STYRENE AND A CATALYST THEREFOR
Frederick J. Soderquist, Essexville, Ludo K. Frevel, Midland, and Harold D. Boyce, Coleman, Mich., assignors to The Dow Chemical Company, Midland, Mich., a corporation of Delaware
Filed Dec. 22, 1958, Ser. No. 782,063
1 Claim. (Cl. 252—430)

This invention concerns a method for dehydrogenating ethylbenzene to styrene and a novel catalyst useful therefor.

The use of the so-called self-reactivating catalysts for the dehydrogenation of alkylbenzenes has been well publicized in various patents and technical articles, particularly by K. K. Kearby. These catalysts usually comprise major quantities of $Fe_2O_3$, ZnO, or MgO, with minor quantities of chromium and/or copper salts, and always include a basic compound of the type $K_2O$ or $K_2CO_3$.

Similarly, the literature has many references to the use of vanadium salts in conjunction with activated alumina or other acidic type materials for dehydrogenation reactions.

It has been considered impractical to combine these two catalyst types in one composite material because of the effect the acidic components have on the $K_2O$ or $K_2CO_3$. (See Ind. & Eng. Chem. 42: 298–300, 1950.)

It has now been discovered in accordance with this invention that nominal amounts of a vanadium oxide source material, i.e., an oxide, salt or other compound thermally decomposable to an oxide, such as a vanadium oxide, sulfate, oxysulfate, sulfide, or a vanadate, in amounts up to 2.5 weight percent calculated as elemental vanadium, total catalyst basis, not only may be added to the basic catalysts without destroying their self-reactivating properties and catalytic efficiency, but also such nominal additions result in catalysts superior in efficiency to the same material without vanadium. None of these compounds is poisonous of the basic type, self-reactivating catalysts of this invention, i.e., none contains a harmful negative ion such as bromide, oxybromide, chloride, oxychloride, silicide or a free acid component capable of forming a potassium salt with an alkali metal carbonate or oxide, e.g., a vanadic acid. Furthermore such improvement can be accomplished only by limiting the quantity of the vanadium added to 2.5 weight percent or less, and preferably less than one percent and by incorporating the vanadium compound in the initial dry or wet blended extrusion mixture prior to the catalyst fabrication.

The catalysts of this invention are prepared by mixing a major amount, i.e. in excess of 50 weight percent of one or more of the oxides $Fe_2O_3$, ZnO and MgO with a minor amount less than 10 weight percent of an alkali metal chromate or dichromate, an alkali metal carbonate or oxide, and up to 2.5 weight percent calculated as vanadium of a vanadium oxide or a vanadium compound or salt which yields a vanadium oxide at elevated temperatures whose anions have no harmful effect on the catalyst. To these essential catalyst ingredients, it is preferred to add a minor amount less than 10 weight percent, of porosity promoting and extruding aids such as graphite and a methyl cellulose whose 2 percent aqueous solution at room temperature has a viscosity from 2000 to 3000 centipoises a stabilizing oxide such as $Cu_2O$ and a refractory cement resistant to elevated temperatures and to steam, for example lumnite cement. The catalyst ingredients are dry blended to give an intimate dispersion and thereafter sufficient water is added to provide a slurry or paste which can be extruded. The slurry or paste is then extruded and chopped to give catalyst pellets of the desired size, advantageously $3/16$ in. in diameter. The pellets are then air-dried, advantageously for about 16 to 20 hours, and then are oven dried at a temperature of about 110° to 150° C., advantageously for about 16 to 20 hours. The catalyst is activated prior to use by heating it at a temperature between about 200° and about 650° C. in a current of steam for several hours. Advantageously the catalyst is heated up to about 400° C. and thereafter is heated up to about 650° C. for about 4 hours in a current of steam.

Dehydrogenation of ethylbenzene to styrene is accomplished by passing a mixture of ethylbenzene and steam, advantageously about 2 weight parts of steam per part of ethylbenzene, over the catalyst at a space velocity and at a temperature sufficient to maintain conversion at about 20 to 50 percent, preferably about 40 percent. Such a conversion is advantageously achieved with a temperature ranging between about 550° and about 675° C. and a space velocity of about 0.5 gram of ethylbenzene per ml. of catalyst per hour. Product samples are analyzed by vapor phase chromatography. Non-condensible vent gases are analyzed by mass spectrometry.

The following examples illustrate specific embodiments of this invention.

EXAMPLE 1

The following catalyst mixture was prepared, the proportions of ingredients being given as weight percentages.

| | |
|---|---|
| $Fe_2O_3$ | 29.7 |
| ZnO | 29.7 |
| $Cu_2O$ | 8.9 |
| $Na_2Cr_2O_7$ | 8.9 |
| $K_2CO_3$ | 8.9 |
| Lumnite cement | 3.9 |
| Graphite | 5.1 |
| Methocel | 4.0 |
| $V_2O_5$ | 0.9 |
| | 100.0 |

The mixture was dry blended in a Lancaster Blender for approximately twenty minutes until intimate dispersion of the ingredients was obtained. Blending was continued for another fifteen to twenty minutes, during which time 140 grams of distilled water was slowly added until a slurry or paste suitable for extrusion was obtained. The wetted materials were then transferred to a California Laboratory Model Pelleting Mill and extruded as rapidly as possible through a $3/16$ inch rotary die and chopped to form $3/16$ inch diameter pellets. The pellets were collected on trays and air dried at room temperature for sixteen to twenty hours. They were then transferred to an oven and dried at 110° to 150° C. for an additional sixteen to twenty hours.

After drying, a 70 ml. sample of the pellets was placed in a vertical, electrically heated reactor tube with suitable feed, vaporizing and recovery appurtenances. The catalyst temperature was immediately raised to 200° C. and held there for two hours, raised rapidly to 300° C. and held for two hours, the steam flow started (61.2 g./hr.) and the temperature raised to 400° C. and held for two hours, raised to 600° C. and held for two hours, then finally raised rapidly to 650° C. and the ethylbenzene flow started (31.0 g./hr.). Thereafter the temperature was adjusted so that approximately 41 percent styrene was produced in the crude product. The operation was continued for a total of 458 hours from the time the hydrocarbon flow was started. During this period of time eight liquid composite samples of the product were completely analyzed, and in addition two gaseous samples of the non-condensible vent gases were taken and analyzed.

Table I presents a summation of the data from dehydrogenating ethylbenzene over such catalysts. Each horizontal tabulation represents some 300 to 400 hours of continuous operation during which time six to eight composite product samples were taken and analyzed, the values shown being the average of these determinations. The gasification was measured using a water displacement meter at room temperature and pressure. Vapor phase chromatography was used for the analysis of the liquid products. Gaseous products were analyzed by mass spectrometric methods. The conversion and yield values were calculated via a total carbon-hydrogen balance incorporating both the liquid and gas phases.

Run 1 was made using a standard self-reactivating catalyst with no vanadium addition. The balance of the runs were made with vanadium-containing catalysts, the quantities and particular vanadium compound employed being shown in the table.

The mode of operation was to adjust the temperature, keeping the flow rate constant, until approximately 41 percent conversion was obtained, thereafter changing only the temperature so as to keep this conversion level constant. The vanadium-containing catalysts' superiority is apparent not only in the higher ultimate yields shown, but also in the lesser quantities of vent gases produced. The vent gas directly reflects the thermal degradation or degree of secondary reaction that the processed material undergoes when conversion levels to styrene are held constant.

*Table I*

SELF-REACTIVATING STYRENE CATALYSTS

| Run No. | Catalyst composition, weight percent | | | | | | | | | | | |
|---|---|---|---|---|---|---|---|---|---|---|---|---|
| | $Fe_2O_3$ | ZnO | $Cu_2O$ | $Na_2Cr_2O_7$ | $K_2CO_3$ | Lumnite cement | Graphite | Methocel | $VOSO_4$ $2H_2O$ | $V_2O_5$ | $NH_4VO_3$ | As V |
| 1 | 30.0 | 30.0 | 9.0 | 9.0 | 9.0 | 3.9 | 5.1 | 4.0 | | | | 0 |
| 2 | 29.5 | 29.5 | 8.8 | 8.8 | 8.8 | 3.8 | 5.0 | 3.9 | 1.9 | | | .5 |
| 3 | 28.9 | 28.9 | 8.7 | 8.7 | 8.7 | 3.7 | 4.9 | 3.8 | 3.7 | | | 1.0 |
| 4 | 29.7 | 29.7 | 8.9 | 8.9 | 8.9 | 3.9 | 5.0 | 4.0 | 1.0 | | | .25 |
| 5 | 29.7 | 29.7 | 8.9 | 8.9 | 8.9 | 3.9 | 5.1 | 4.0 | | 0.9 | | .5 |
| 6 | 29.7 | 29.7 | 8.9 | 8.9 | 8.9 | 3.9 | 5.0 | 3.9 | | | 1.1 | .5 |
| 7 | 29.3 | 29.3 | 8.8 | 8.8 | 8.8 | 3.8 | 5.0 | 3.9 | | | 2.3 | 1.9 |

| Run No. | Operating temp., °C. | As V | Feed rate, gms./hr. | | Percent styrene | Percent conv.[1] to styrene | Percent yield[1] of styrene | Gasification | |
|---|---|---|---|---|---|---|---|---|---|
| | | | E.B. | $H_2O$ | | | | Ft.³/lb. E.B. fed | Ft.³/lb. styrene made |
| 1 | 615 | 0 | 32.9 | 65.9 | 41.0 | 40.96 | 90.58 | 2.469 | 6.027 |
| 2 | 615 | 0.5 | 31.6 | 61.9 | 40.8 | 40.98 | 94.19 | 1.951 | 4.760 |
| 3 | 605 | 1.0 | 32.4 | 61.4 | 40.7 | 40.86 | 93.12 | 2.010 | 4.918 |
| 4 | 615 | 0.25 | 32.2 | 62.4 | 41.3 | 41.42 | 92.60 | 2.163 | 5.221 |
| 5 | 605 | 0.5 | 31.0 | 61.2 | 40.8 | 20.91 | 93.25 | 2.063 | 5.042 |
| 6 | 620 | 0.5 | 32.3 | 63.7 | 40.0 | 40.13 | 92.44 | 2.080 | 5.183 |
| 7 | 620 | 1.0 | 32.5 | 61.8 | 40.6 | 40.78 | 93.36 | 1.999 | 4.902 |

[1] Calculated on vent gas measurement and analysis.

EXAMPLE 2

The procedure of Example 1 was repeated with the catalysts and results as given in following Table II.

*Table II*

SELF-REACTIVATING STYRENE CATALYSTS

| Run No. | Catalyst composition, weight percent | | | | | | | | | | | | | |
|---|---|---|---|---|---|---|---|---|---|---|---|---|---|---|
| | $Fe_2O_3$ | ZnO | $Cu_2O$ | $Na_2Cr_2O_7$ | $K_2CO_3$ | Lumnite cement | Graphite | Methocel | MgO | $Cr_2O_3$ | $VOSO_4$ $.2H_2O$ | $V_2O_5$ | As V | Tannic acid |
| 1 | | 87.90 | | | 7.00 | | | | | 5.00 | | | 0 | .10 |
| 2 | | 87.10 | | | 6.95 | | | | | 4.95 | | .90 | .50 | .10 |
| 3 | | | | | 7.00 | | | | 87.90 | 5.00 | | | 0 | .10 |
| 4 | | | | | 6.95 | | | | 87.10 | 4.95 | | .90 | .50 | .10 |
| 5 | 87.90 | | | | 7.00 | | | | | 5.00 | | | 0 | .10 |
| 6 | 86.18 | | | | 8.86 | | | | | 4.90 | 1.96 | | .50 | .10 |
| 7 | 27.30 | 27.30 | 8.20 | 8.20 | 8.20 | 3.60 | 4.60 | 3.60 | | | | 9.00 | 5.00 | |
| 8 | 28.80 | 28.80 | 8.90 | 8.90 | 8.90 | 3.90 | 5.10 | 4.00 | | | | 2.70 | 1.50 | |
| 9 | 28.50 | 28.50 | 8.50 | 8.50 | 8.50 | 3.90 | 5.10 | 4.00 | | | | 4.50 | 2.50 | |

| Run No. | As V | Operating temp., °C. | Feed rate, gms./hr. | | Percent styrene | Percent conv. to styrene | Percent yield of styrene | Gasification | |
|---|---|---|---|---|---|---|---|---|---|
| | | | E.B. | $H_2O$ | | | | Ft.³/lb. E.B. fed | Ft.³/lb. styrene made |
| 1 | 0 | 655 | 33.1 | 64.1 | 40.0 | 40.00 | 88.05 | 2.264 | 5.660 |
| 2 | 0.5 | 650 | 32.4 | 62.5 | 40.0 | 40.06 | 90.25 | 2.088 | 5.212 |
| 3 | 0 | 625 | 31.9 | 61.8 | 40.3 | 40.05 | 90.00 | 2.912 | 7.280 |
| 4 | 0.5 | 625 | 33.0 | 62.2 | 40.1 | 39.94 | 90.65 | 2.673 | 6.683 |
| 5 | 0 | 600 | 32.1 | 61.9 | 40.1 | 39.75 | 85.21 | 2.951 | 7.425 |
| 6 | 0.5 | 625 | 31.2 | 58.7 | 40.1 | 39.83 | 89.69 | 2.908 | 7.299 |
| 7 | 5.0 | 650 | 32.15 | 62.1 | 38.9 | 38.31 | 85.44 | 3.502 | 9.140 |
| 8 | 1.5 | 610 | 32.2 | 62.5 | 40.1 | 40.29 | 93.22 | 2.140 | 5.311 |
| 9 | 2.5 | 615 | 32.5 | 60.7 | 40.5 | 40.62 | 91.67 | 2.227 | 5.483 |

The results obtained with the catalysts of Examples 1 and 2 are given in the accompanying drawing wherein percent vanadium in the catalyst is plotted against percent yield of styrene and against gasification, ft.³/lb. styrene. The graphic results are summarized in the following table.

Table III

| Percent vanadium in catalyst | Percent yield of styrene | Gasification, ft.³/lb. styrene |
|---|---|---|
| 0.00 | 90.58 | 6.027 |
| 0.25 | 92.60 | 5.221 |
| 0.50 | 93.59 | 4.904 |
| 1.00 | 93.24 | 4.910 |
| 1.50 | 93.22 | 5.311 |
| 2.50 | 91.67 | 5.483 |
| 5.00 | 85.44 | 9.140 |

What is claimed is:

A catalyst consisting of 29.7 weight percent $Fe_2O_3$, 29.7 percent ZnO, 8.9 percent of each of $Cu_2O$, $Na_2Cr_2O_7$, and $K_2CO_3$, 5.1 percent graphite, 3.9 percent of a refractory cement, 4 percent of a methyl cellulose having a viscosity as a 2 percent solution in water of 2000 to 3000 centipoises and 0.9 percent $V_2O_5$, which catalyst is self-reactivating in the presence of steam at 550° to 675° C.

References Cited in the file of this patent

UNITED STATES PATENTS

| | | |
|---|---|---|
| 1,986,241 | Wulff et al. | Jan. 1, 1935 |
| 2,385,484 | Wright | Sept. 25, 1945 |
| 2,457,719 | Pine et al. | Dec. 28, 1948 |
| 2,481,824 | Claussen et al. | Sept. 13, 1949 |
| 2,615,899 | Sears | Oct. 28, 1952 |
| 2,666,086 | Pitzer | Jan. 12, 1954 |
| 2,824,074 | Sieg | Feb. 18, 1958 |
| 2,870,228 | Armstrong et al. | Jan. 20, 1959 |